(12) United States Patent
Woo et al.

(10) Patent No.: US 9,159,157 B2
(45) Date of Patent: Oct. 13, 2015

(54) APPARATUS AND METHOD FOR TILE BINNING

(71) Applicant: SAMSUNG ELECTRONICS CO., LTD., Suwon-si (KR)

(72) Inventors: Sang Oak Woo, Anyang-si (KR); Seok Yoon Jung, Seoul (KR); Shi Hwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 13/657,309

(22) Filed: Oct. 22, 2012

(65) Prior Publication Data

US 2013/0113799 A1 May 9, 2013

(30) Foreign Application Priority Data

Nov. 9, 2011 (KR) ........................ 10-2011-0116533

(51) Int. Cl.
G06T 15/40 (2011.01)
G06T 17/00 (2006.01)
G06T 15/30 (2011.01)
G06T 15/00 (2011.01)

(52) U.S. Cl.
CPC ................................... *G06T 15/005* (2013.01)

(58) Field of Classification Search
CPC ................................. G06T 15/005; H02K 9/26
See application file for complete search history.

(56) References Cited

U.S. PATENT DOCUMENTS

| 5,995,661 | A | * | 11/1999 | Amidei ........................ 382/199 |
| 6,034,699 | A | | 3/2000 | Wong et al. |
| 7,167,171 | B2 | | 1/2007 | Heim et al. |
| 2009/0046098 | A1 | * | 2/2009 | Barone et al. ................. 345/420 |

FOREIGN PATENT DOCUMENTS

| KR | 10-0550240 | 2/2006 |
| KR | 10-0762811 | 9/2007 |

* cited by examiner

*Primary Examiner* — Sing-Wai Wu
(74) *Attorney, Agent, or Firm* — NSIP Law

(57) ABSTRACT

An apparatus and method for tile binning are provided. The tile binning apparatus may include a determination unit to determine whether a triangle obtained as a result of geometric processing includes an abnormal edge, an overlap test unit to perform an overlap test with respect to each edge of the triangle when the abnormal edge is absent from the triangle, and to sort three vertices of the triangle according to Y-axis values and perform the overlap test with respect to each edge of the triangle based on a sorting result when the triangle includes the abnormal edge, and a bin array update unit to update a bin array based on an overlap test result.

18 Claims, 12 Drawing Sheets

FIG. 5
500

| Slope 510 | Triangle Location 520 | Example 530 | Scan Orientation 540 | Update variable 550 |
|---|---|---|---|---|
| Positive 511 | Left 521 | | X: ← Y: ↓  541 | Line End 551 |
| Positive 511 | Right 522 | | X: → Y: ↑  542 | Line Start 552 |
| Negative 512 | Left 523 | | X: → Y: ↓  543 | Line Start 553 |
| Negative 512 | Right 524 | | X: ← Y: ↑  544 | Line End 554 |

FIG. 11

| Abnormal edge triangle type / Edge | Abnormal edge positive_right (1111) | Abnormal edge positive_left (1112) | Abnormal edge negative_right (1113) | Abnormal edge negative_left (1114) |
|---|---|---|---|---|
| (Min-Max) edge (1101) | POSITIVE_RIGHT | POSITIVE_LEFT | NEGATIVE_RIGHT | NEGATIVE_LEFT |
| (Min-Mid) edge (1102) | POSITIVE_LEFT | POSITIVE_RIGHT | NEGATIVE_LEFT | NEGATIVE_RIGHT |
| (Mid-Max) edge (1103) | POSITIVE_LEFT | POSITIVE_RIGHT | NEGATIVE_LEFT | NEGATIVE_RIGHT |

1121

APPARATUS AND METHOD FOR TILE
BINNING

CROSS-REFERENCE TO RELATED APPLICATIONS

This application claims the priority benefit of Korean Patent Application No. 10-2011-0116533, filed on Nov. 9, 2011, in the Korean Intellectual Property Office, the disclosure of which is incorporated herein by reference.

BACKGROUND

1. Field

Example embodiments of the following description relate to a tile binning apparatus and method. More specifically, example embodiments relate to a tile binning apparatus and method that consume a reduced amount of power.

2. Description of the Related Art

A three-dimensional (3D) rendering technology has been developed and applied to a mobile multi-media device. The mobile multi-media device may operate various applications with a limited amount of power and thus, a main issue for the technology is low power consumption.

3D rendering technology may display a 3D object on a two-dimensional (2D) plane and therefore may need to perform a large quantity of operations or calculations. Particularly, a triangle may be obtained as a result of geometric processing with respect to the 3D object, and information about an overlap between the triangle and a tile on the 2D plane may be important. For example, as a degree of the overlap between the triangle and the tile on the 2D plane increases, a number of reading operations with respect to a memory increases, which may result in a relatively large amount of power consumption.

The power consumption resulting from using the memory may be reduced by additionally performing an operation of reducing an overlap factor, which denotes the degree of the overlap between the triangle and the tile on the 2D plane. However, since the operation of reducing the overlap factor may also result in an additional operation, there is a desire for a criterion for determining whether to perform the operation of reducing the overlap factor.

SUMMARY

The foregoing and/or other aspects are achieved by providing a tile binning apparatus including a determination unit to determine whether a triangle obtained as a result of geometric processing includes an abnormal edge, an overlap test unit to perform an overlap test with respect to each edge of the triangle when the abnormal edge is absent from the triangle, and to sort three vertices of the triangle according to Y-axis values and perform the overlap test with respect to each edge of the triangle based on a sorting result when the triangle includes the abnormal edge, and a bin array update unit to update a bin array based on an overlap test result.

The foregoing and/or other aspects are achieved by providing a tile binning method including determining whether a triangle obtained as a result of geometry processing includes an abnormal edge, performing an overlap test with respect to each edge of the triangle when the abnormal edge is absent from the triangle, sorting three vertices of the triangle according to Y-axis values and performing the overlap test with respect to each edge of the triangle based on a sorting result when the triangle includes the abnormal edge, and updating a bin array based on an overlap test result.

The foregoing and/or other aspects are achieved by providing a tile binning apparatus. The tile binning apparatus includes a determination unit to determine whether a triangle obtained as a result of geometric processing includes an abnormal edge, and an overlap test unit to determine whether the triangle includes a 1-dimensional edge when no abnormal edge is determined by the determination unit to exist in the triangle, and to perform an overlap test with respect to each edge of the triangle other than the 1-dimensional edge, when the triangle is determined to include the 1-dimensional edge.

The foregoing and/or other aspects are achieved by providing a tile binning method. The tile binning method includes determining whether a triangle obtained as a result of geometric processing includes an abnormal edge, determining whether the triangle includes a 1-dimensional edge when the triangle is determined as not including the abnormal edge, and performing an overlap test with respect to each edge of the triangle other than the 1-dimensional edge when the triangle is determined to include the 1-dimensional edge.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 5 illustrates a first table recording an overlap test method according to a type of bounding box of an edge, according to example embodiments;

FIG. 11 illustrates a second table including an overlap test method according to a type of a triangle including an abnormal edge, according to example embodiments.

DETAILED DESCRIPTION

Figure 1:
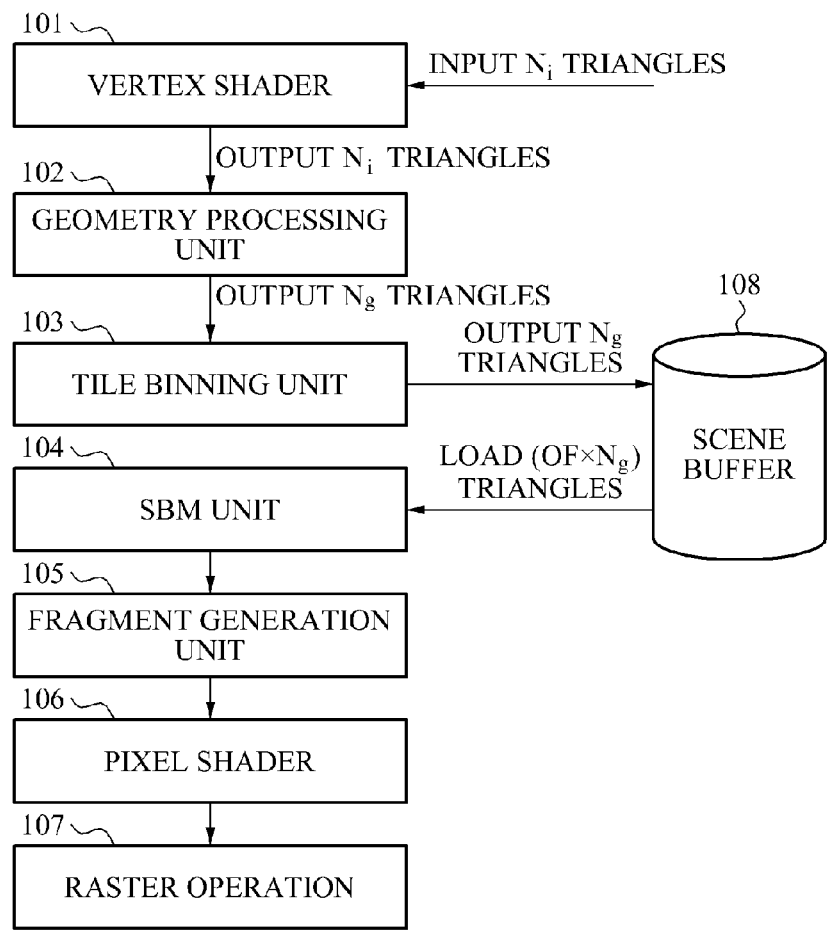
FIG. 1 illustrates a three-dimensional (3D) rendering apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a three-dimensional (3D) rendering apparatus according to example embodiments.

Referring to FIG. 1, the 3D rendering apparatus may include, for example, a vertex shader 101, a geometry processing unit 102, a tile binning unit 103, a scene buffer management (SBM) unit 104, a fragment generation unit 105, a pixel shader unit 106, a raster operation (ROP) unit 107, and a scene buffer 108.

When an $N_i$-number of triangles are input from an outside, where $N_i$ is an integer greater than or equal to one, the vertex shader 101 may shade respective vertices of the input triangles. That is, the vertex shader 101 may apply shading and color patterns to respective vertices of each of the input triangles to obtain a realistic graphic of an object.

The geometry processing unit 102 may perform clipping with respect to the $N_i$-number of triangles, calculate a light source, and perform a coordinate transformation through projection, thereby outputting an $N_g$-number of triangles, where $N_g$ is an integer less than or equal to $N_i$. When the $N_i$-number of triangles are not fully present within a clipping area, the number of triangles may be increased due to the clipping.

The tile binning unit 103 may determine which tile of a plurality of tiles constituting a two-dimensional (2D) plane overlaps with the $N_i$-number of input triangles. As a result of determination of the tile binning unit 103, the number of triangles read by the scene buffer 108 may be a product of an overlap factor (OF) and $N_g$. The OF refers to a numerical value indicating a degree of overlap between a triangle and a tile. As the OF increases, an overlapping area between the triangle and the tile increases. In this case, accordingly, a reading operation with respect to a memory is increased. Consequently, an amount of power consumption is increased.

To this end, the tile binning unit 103 may additionally perform an operation of reducing the OF to reduce the amount of power consumed by the reading operation performed with respect to the memory. However, the operation of reducing the OF may also consume power and may be unnecessary in some cases. Therefore, the tile binning unit 103 may perform an overlap test with respect to each edge of the triangle. Operations of the tile binning unit 103 will be described with reference to FIGS. 2 through 13.

The SBM unit 104 may load $OF \times N_g$ triangles among triangles stored in the scene buffer 108.

The fragment generating unit 105 may generate a fragment with respect to the loaded $OF \times N_g$ triangles. A point on a screen may be referred to as a pixel, and a fragment may denote a unit managed by the 3D rendering apparatus to determine a color of the pixel.

The pixel shader 106 may perform shading with respect to pixels included in the fragment. The ROP 107 may perform a rasterizing operation with respect to the shaded fragment.

Figure 2:
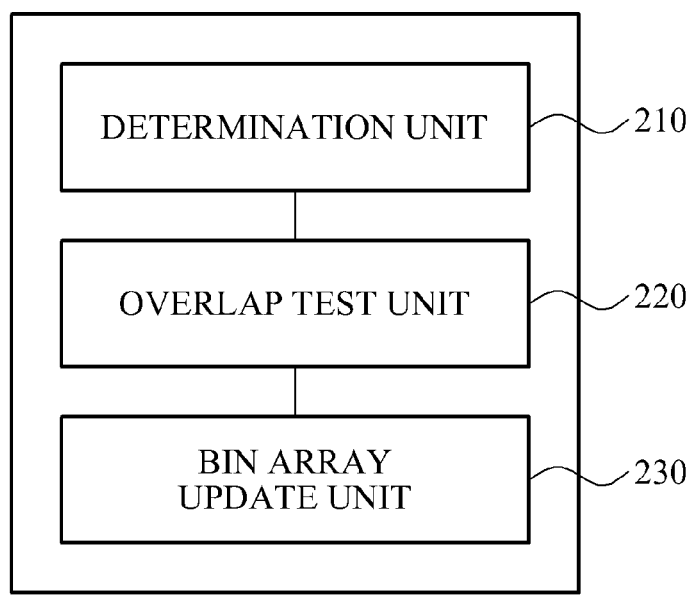
FIG. 2 illustrates a structure of a tile binning apparatus according to example embodiments.

FIG. 2 illustrates a tile binning unit according to example embodiments.

Referring to FIG. 2, a tile binning apparatus 200 according to the example embodiments may include, for example, a determination unit 210, an overlap test unit 220, and a bin array update unit 230.

The tile binning apparatus 200, which may correspond to the tile binning unit 103 shown in FIG. 1, may perform an overlap test that determines which tile, among a plurality of tiles constituting a 2D plane, overlaps the triangle. Here, the tile binning apparatus 200 may perform the overlap test for each edge of the triangle as a method for acquiring an increased efficiency with a reduced amount of power consumption by reducing the OF. That is, the overlap test unit 220 may determine the tile overlapping the triangle, not based on a bounding box with respect to the entire triangle but rather, based on a bounding box with respect to each edge of the triangle.

Figure 3:
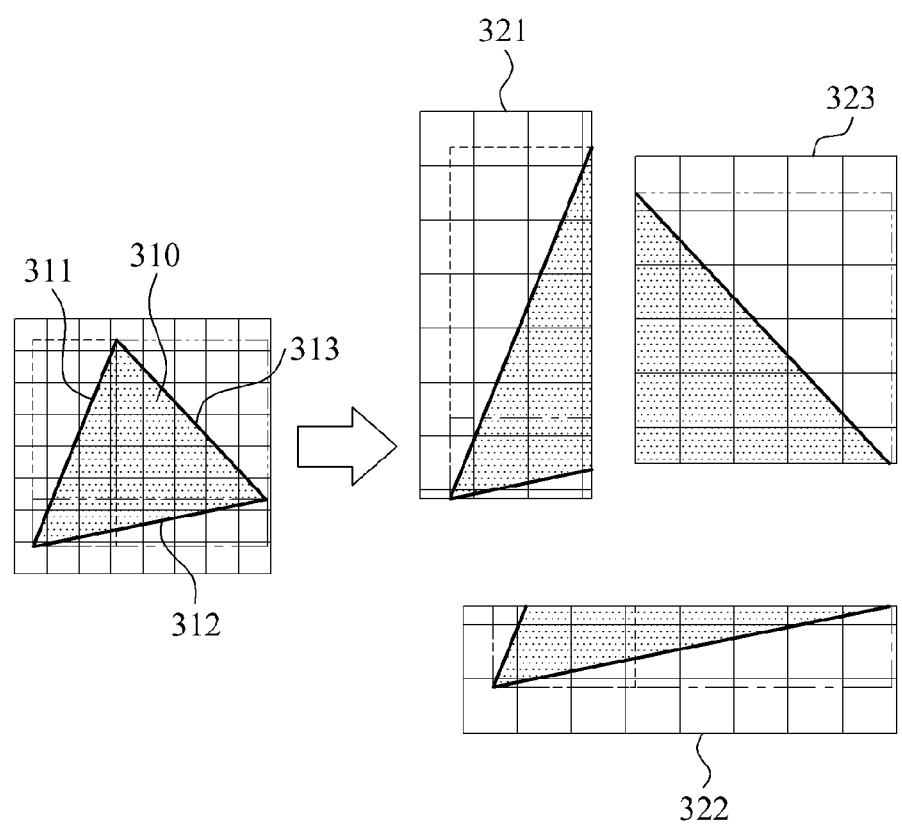
FIG. 3 illustrates an overlap test performed with respect to each edge by an overlap test unit of a tile binning apparatus according to example embodiments.

Referring to FIG. 3, the tile binning apparatus 200 may determine which tile overlaps a triangle 310 by way of three edges 311, 312, and 313 of the triangle 310. That is, the tile binning apparatus 200 may generate bounding boxes 321, 322, and 323 with respect to the three edges 311, 312, and 313, respectively, and then perform the overlap test with respect to each bounding box.

Here, the tile binning apparatus 200 may define an abnormal edge and a one-dimensional (1D) edge according to an edge shape to omit the overlap test or to allow for application of a different method according to the type of edge.

Hereinafter, the operation of the tile binning apparatus 200 will be described with respect to various components, in greater detail.

The determination unit 210 may determine whether a triangle includes an abnormal edge, the triangle being obtained as a result of geometric processing being performed by the geometry processing unit 102 described in FIG. 1.

When vertices of a bounding box of an edge and vertices of a bounding box of a triangle share at least two overlapping vertices, the edge is referred to as the abnormal edge. Therefore, when four vertices of a bounding box of an edge of a triangle include at least two vertices overlapping vertices of a bounding box of the triangle, the determination unit 210 may determine the edge as the abnormal edge.

The overlap test unit 220 may perform the overlap test differently depending on whether the triangle includes the abnormal edge.

When the abnormal edge is absent from the triangle, the overlap test unit 220 may perform the overlap test with respect to each edge of the triangle. When the triangle includes the abnormal edge, the overlap test unit 220 may sort three vertices according to Y-axis values and perform the overlap test with respect to each edge of the triangle based on the sorting result.

When the abnormal edge is absent from the triangle, the overlap test unit 220 may determine whether the triangle includes a 1D edge. When a tile overlapping any one edge of the triangle is 1D, the edge is referred to as the 1D edge. Therefore, when a tile overlapping any one edge of the triangle is 1D, the overlap test unit 220 may determine the edge to be the 1D edge.

Figure 4:
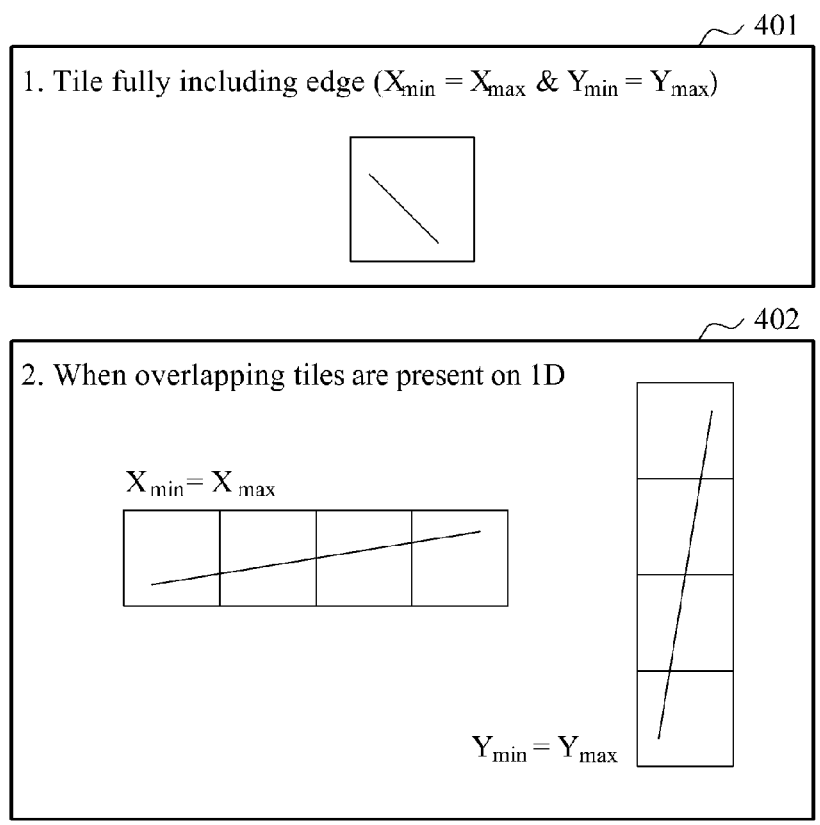
FIG. 4 illustrates a one-dimensional (1D) edge according to example embodiments.

Referring to FIG. 4, the overlap test 220 may determine any one edge as the 1D edge i) when the any one edge fully includes one tile ($X_{min}=X_{max}$ & $Y_{min}=Y_{max}$) 401 or ii) when a tile overlapping the any one edge is present on 1D ($X_{min}=X_{max}$ or $Y_{min}=Y_{max}$) 402.

When the three edges of the triangle include the 1D edge, the overlap test unit 220 may not perform the overlap test with respect to the 1D edge but may instead perform the overlap test with respect to remaining edges other than the 1D edge. This is because, when the triangle includes the 1D edge, all tiles in the bounding box of the 1D edge overlap the 1D edge and thus, the overlap test is unnecessary. Therefore, in an embodiment, the overlap test unit 220 may perform the overlap test only with respect to the remaining edges as mentioned previously, thereby reducing a quantity of operations of the overlap test.

The overlap test unit 220 may determine slopes of the remaining edges, except for the 1D edge. For example, the overlap test unit 220 may determine whether the slopes of the remaining edges have positive values or negative values.

The overlap test unit 220 may determine a position of the triangle relative to positions of the remaining edges, except for the 1D edge. For example, the overlap test unit 220 may determine whether the triangle is located on the left or on the right of the remaining edges.

When the slopes of the remaining edges and the position of the triangle are determined, the overlap test unit 220 may determine types of bounding boxes of the remaining edges using the slopes and the position of the triangle. For example, when an edge has a positive slope and the triangle is located on the right of the edge, the type of the bounding box of the edge may be 'positive-right.'

When the types of the bounding boxes of the remaining edges are determined, the overlap test unit 220 may select an overlap test method corresponding to the determined types of the bounding boxes by referencing a first table. In addition, the overlap test unit 220 may perform the overlap test with respect to the remaining edges using the selected overlap test method.

According to an aspect, the tile binning apparatus 200 may further include a database (DB). The DB may store the first table recording the overlap test method according to types of a bounding box of an edge. The first table may include information on a scan orientation for performing the overlap test depending on the position of the triangle relative to the slopes and the positions of the edges and on an update variable.

Therefore, the overlap test unit 220 may extract scan orientation information corresponding to the determined types of the bounding boxes from the first table, and scan tiles within the bounding boxes according to the extracted scan orientation, thereby performing the overlap test.

The overlap test performed by the overlap test unit 220 using the first table will be described in detail again with reference to FIG. 5.

When the triangle includes an abnormal edge, the overlap test unit 220 may sort three vertices of the triangle into a minimum vertex, a medium vertex, and a maximum vertex. For example, the overlap test unit 220 may sort the three vertices into a vertex having a smallest Y-axis value as the minimum vertex, a vertex having a medium Y-axis value as the medium vertex, and a vertex having a largest Y-axis value as the maximum vertex.

An edge connecting the minimum vertex and the maximum vertex is defined as a first edge, an edge connecting the minimum vertex and the medium vertex is defined as a second edge, and an edge connecting the medium vertex and the maximum vertex is defined as a third edge. The overlap test unit 220 may determine whether the first edge, the second edge, and the third edge include an edge corresponding to the 1D edge.

When the 1D edge is included among the first edge, the second edge, and the third edge, the overlap test unit 220 may perform the overlap test with respect to remaining edges except the 1D edge.

The overlap test unit 220 may determine a slope of the first edge that connects the minimum vertex and the maximum vertex. For example, the overlap test unit 220 may determine the slope of the first edge as a positive value or a negative value.

In addition, the overlap test unit 220 may determine a position of the medium vertex relative to a position of the first edge. For example, the overlap test unit 220 may determine the position of the medium vertex to be on a right or a left of the first edge.

When the slope of the first edge and the position of the medium edge-vertex are determined, the overlap test unit 220 may determine a type of the triangle including the abnormal edge using the determined slope and position. For example, when the first edge has a negative slope and the triangle is located on the left of the first edge, the type of the triangle including the abnormal edge may be 'negative-right.'

When the type of the triangle including the abnormal edge is determined, the overlap test unit 220 may select a method of the overlap test performed with respect to the first edge, the second edge, and the third edge corresponding to the determined type of the triangle by referencing a second table. In addition, the overlap test unit 220 may perform the overlap test with respect to the first edge, the second edge, and the third edge, respectively, using the selected overlap test method.

According to an aspect, the tile binning apparatus 200 may further include a DB. The DB may store the second table, which records the overlap test method depending on the type of the triangle including the abnormal edge. The second table may include types of bounding boxes with respect to the first edge, the second edge, and the third edge according to the type of the triangle including the abnormal edge. Therefore, when the type of the triangle is determined, the overlap test unit 220 may determine the types of the bounding boxes with respect to the first edge, the second edge, and the third edge by referencing the second table, and determine the overlap test method corresponding to the respective types of the bounding boxes by referencing the first table. Accordingly, the overlap test unit 220 may perform the overlap test with respect to the first edge, the second edge, and the third edge.

The bin array update unit 230 updates a bin array based on a result of the overlap test performed by the overlap test unit.

FIG. 5 illustrates a first table 500 recording an overlap test method according to a type of bounding box of an edge, according to example embodiments.

Referring to FIG. 5, the first table 500 may include, for example, information on an edge slope 510, a triangle position 520, a scan orientation 540 for performing the overlap test, and an update variable 550.

An example 530 shows types of bounding boxes of respective edges and may be omitted from the first table 500.

The slope edge 510 may include, for example, positive 511 and negative 512.

The triangle position 520 may indicate a position of a triangle relative to a position of an edge. The triangle position 520 may include left 521 and 523 indicating a case in which the triangle is located on the left of the edge, and right 522 and 524 indicating a case in which the triangle is located on the right of the edge.

An overlap test unit may perform an overlap test by determining the overlap test method with respect to an edge using the first table 500.

Figure 6:
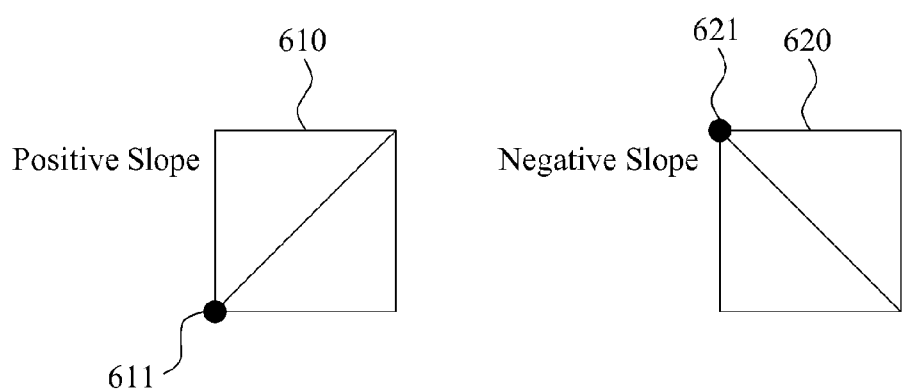
FIG. 6 illustrates an operation of determining a slope of an edge by an overlap test unit of a tile binning apparatus according to example embodiments.

The overlap test unit may determine a slope of an edge with respect to the overlap test that is to be performed. Referring to FIG. 6, when the edge passes through a lower left vertex 611 of a tile 610, the overlap test may determine the slope of the edge as positive 511. In addition, when the edge passes through an upper left vertex 621 of a tile 620, the overlap test unit may determine the slope of the edge as negative 512.

Referring to FIG. 5 again, the overlap test unit may determine the position of the triangle relative to the position of the edge with respect to the overlap test that will be performed. Depending on embodiments, to determine the position of the triangle relative to position of the edge, the overlap test unit may extract a position of an overlapping vertex between a bounding box of the edge and a bounding box of the triangle, and determine that the triangle is located on the opposite side of the extracted position of the vertex.

Figure 7:
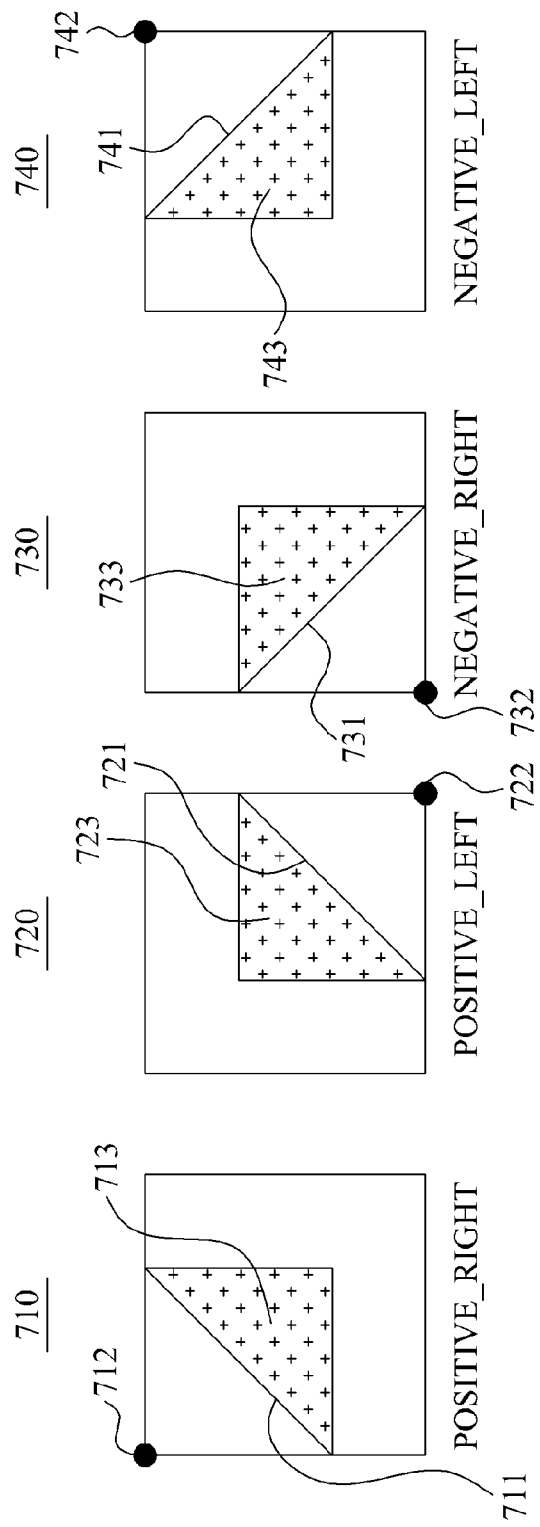
FIG. 7 illustrates an operation of determining a position of a triangle by an overlap test unit of a tile binning apparatus according to example embodiments.

For example, referring to FIG. 7, in a first case 710, a vertex overlapping between a bounding box of a triangle 713 and a bounding box of an edge 711 is an upper left vertex 712. Therefore, the overlap test unit may determine the position of the triangle 713 to be 'right' of the edge 711, that is, the opposite side of the upper left vertex 712.

In a second case 720, a vertex overlapping between a bounding box of a triangle 723 and a bounding box of an edge 721 is a lower right vertex 722. Therefore, the overlap test unit may determine the position of the triangle 723 to be 'left' of the edge 721, that is, the opposite side of the lower right vertex 722.

In a third case 730, a vertex overlapping between a bounding box of a triangle 733 and a bounding box of an edge 731 is a lower left vertex 732. Therefore, the overlap test unit may determine the position of the triangle 733 to be 'right' of the edge 731, that is, the opposite side of the lower left vertex 732.

In a fourth case 740, a vertex overlapping between a bounding box of a triangle 724 and a bounding box of an edge 741 is an upper right vertex 742. Therefore, the overlap test unit may determine the position of the triangle 743 to be 'left' of the edge 741, that is, the opposite side of the upper right vertex 742.

When the slope of the edge and the position of the triangle are determined, the overlap test unit may determine a type of a bounding box of an edge with respect to which the abnormal edge will be performed, using the slope and the position.

For example, in the first case 710, the overlap test unit may determine a slope of the edge 711 as positive 511 and the position of the triangle 713 to be right 522, and therefore may determine a type of the bounding box of the edge 711 to be 'positive-right.'

In the second case 720, the overlap test unit may determine the slope of the edge 721 to be positive 511 and the position of the triangle 723 as left 521, and therefore may determine a type of the bounding box of the edge 721 to be 'positive-left.'

In the third case 730, the overlap test unit may determine the slope of the edge 731 to be negative 512 and the position of the triangle 733 to be right 524, and therefore may determine a type of the bounding box of the edge 731 to be 'negative-right.'

In the fourth case 740, the overlap test unit may determine the slope of the edge 741 to be negative 512 and the position of the triangle 743 to be left 523, and therefore may determine a type of the bounding box of the edge 741 to be 'negative-left.'

When the types of the bounding boxes of the edges are determined, the overlap test unit may extract an overlap test method corresponding to the determined types of the bounding boxes from the first table. In addition, the overlap test unit may perform the overlap test with respect to the edges using the extracted overlap test method.

For example, in the first case 710, since the type of bounding box of edge 711 is determined to be 'positive-right', the overlap test unit may extract a second scan orientation 542 corresponding to the type 'positive-right' in which the slope of edge 711 is positive 511 and the position of triangle 713 is right 522, from the first table 500. Additionally, the overlap test unit may perform the overlap test to discover which tile among tiles within the bounding box of the edge 711 overlaps edge 711, based on the second scan orientation 542. Here, the second scan orientation 542 may refer to a positive X-axis direction and a positive Y-axis direction in which the overlap test unit scans the bounding box of the edge 711 from a lower left vertex of the bounding box of the edge 711. Since the overlap test unit scans an overlap state from the lower left vertex in the positive X-axis direction and the positive Y-axis direction, when performing the overlap test to remove a false-overlapped tile, the overlap test unit may update only a line start variable 552 of a Y-axis of each tile. The update will be described once more with reference to FIG. 8.

In the second case 720, since the type of bounding box of edge 721 is determined to be 'positive-left', the overlap test unit may extract a first scan orientation 541 corresponding to the type 'positive-left' in which the slope of edge 721 is positive 511 and the position of triangle 723 is left 521, from the first table 500. Additionally, the overlap test unit may perform the overlap test to discover which tile among tiles within the bounding box of the edge 721 overlaps edge 721, based on the first scan orientation 541. Here, the first scan orientation 541 may refer to a negative X-axis direction and a negative Y-axis direction in which the overlap test unit scans the bounding box of the edge 721 from an upper right vertex of the bounding box of edge 721. Since the overlap test unit scans an overlap state from the upper right vertex in the negative X-axis direction and the negative Y-axis direction, when performing the overlap test to remove a false-overlapped tile, the overlap test unit may update only a line end variable 551 of a Y-axis of each tile.

In the third case 730, since the type of bounding box of edge 731 is determined to be 'negative-right', the overlap test unit may extract a fourth scan orientation 544 corresponding to the type 'negative-right' in which the slope of edge 731 is negative 512 and the position of the triangle 733 is right 524, from the first table 500. Additionally, the overlap test unit may perform the overlap test to find which tile among tiles within the bounding box of the edge 731 overlaps the edge 731, based on the fourth scan orientation 544. Here, the fourth scan orientation 544 may refer to a negative X-axis direction and a positive Y-axis direction in which the overlap test unit scans the bounding box of edge 731 from an upper left vertex of the bounding box of edge 731. Since the overlap test unit scans an overlap state from the upper left vertex in the negative X-axis direction and the positive Y-axis direction, when performing the overlap test to remove a false-overlapped tile, the overlap test unit may update only a line start variable 554 of a Y-axis of each tile.

In the fourth case 740, since the type of bounding box of edge 741 is determined to be 'negative-left', the overlap test unit may extract a third scan orientation 543 corresponding to the type 'negative-left' in which the slope of edge 734 is negative 512 and the position of the triangle 743 is left 523, from the first table 500. Additionally, the overlap test unit may perform the overlap test to find which tile among tiles within the bounding box of the edge 741 overlaps the edge 741, based on the third scan orientation 543. Here, the third scan orientation 543 may refer to a positive X-axis direction and a negative Y-axis direction in which the overlap test unit scans the bounding box of edge 741 from a lower right vertex of the bounding box of edge 741. Since the overlap test unit scans an overlap state from the lower right vertex in the positive X-axis direction and the negative Y-axis direction, when performing the overlap test to remove a false-overlapped tile, the overlap test unit may update only a line end variable 553 of a Y-axis of each tile.

Figure 8:
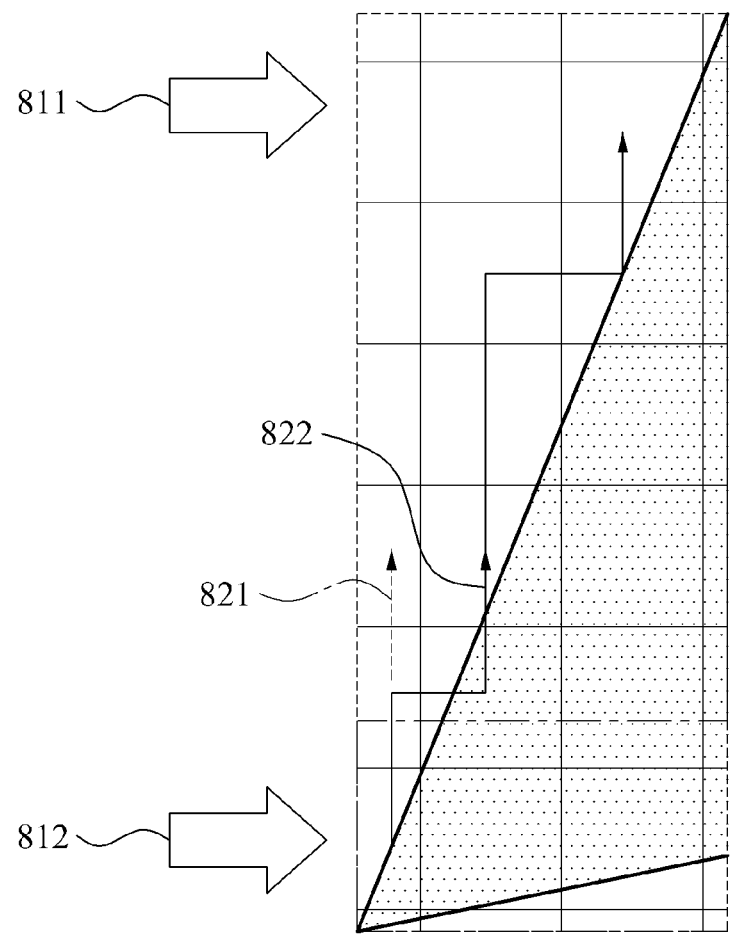
FIG. 8 illustrates an operation of scanning a tile in a bounding box of an edge of a positive-right type, by an overlap test unit of a tile binning apparatus according to example embodiments.

FIG. 8 illustrates an operation of scanning a tile in a bounding box of an edge of a positive-right type, such as by an overlap test unit of a tile binning apparatus, according to example embodiments.

Referring to FIG. 8, when scanning the tile in the bounding box of the edge of the positive-right type, the overlap test unit of the tile binning apparatus may perform the scanning according to the second scan orientation 542 in the first table 500 illustrated with reference to FIG. 5, that is, in the positive X-axis direction and the positive Y-axis direction from the lower left vertex of the bounding box.

That is, the overlap test unit may start scanning from a tile disposed in a leftmost and lowermost position of the bounding box indicated by a lower arrow 812 in FIG. 8.

When the overlap test unit starts scanning from a leftmost and uppermost tile of the bounding box indicated by an upper arrow 811, three false-overlapped tiles are met. However, when the overlap test unit starts scanning from the leftmost and lowermost tile indicated by the lower arrow 812, no false-overlapped tile is met. Therefore, when the bounding box of the edge is the positive-right type, scanning may be performed according to the second orientation 542, that is, in the positive X-axis direction and the positive Y-axis direction from the lower left vertex of the bounding box, thereby precluding a need for an unnecessary test.

In addition, when scanning of one Y-axis is completed, the overlap test unit may scan a next Y-axis according to a scan orientation recorded in the first table. Here, the overlap test unit may scan the next Y-axis from an X-axis value of a last scanned tile when scanning of a previous Y-axis is completed. For example, when it is determined that the edge overlaps over tile 831 as a result of the overlap test performed by the overlap test unit, the overlap test unit may complete scanning of the previous Y-axis including tile 831 and scan the next Y-axis including tiles 832 and 833. Here, the overlap test unit may scan the next Y-axis not from the 832 by resetting the X-axis value but from the tile 833 having the X-axis value of the tile 831 which is already scanned in the previous Y-axis. Since the edge has a straight line form, a tile located above a false-overlapped tile when the bounding box of the edge is the positive-right type or the negative-left type or a tile located below the false-overlapped tile when the bounding box of the edge is the positive-left type or the negative-right type must be also a false-overlapped tile. Using such a principle, the overlap test unit may scan the next Y-axis from a tile having the X-axis value of the tile already scanned in the previous Y-axis. Accordingly, unnecessary operations may be omitted.

Figure 9:
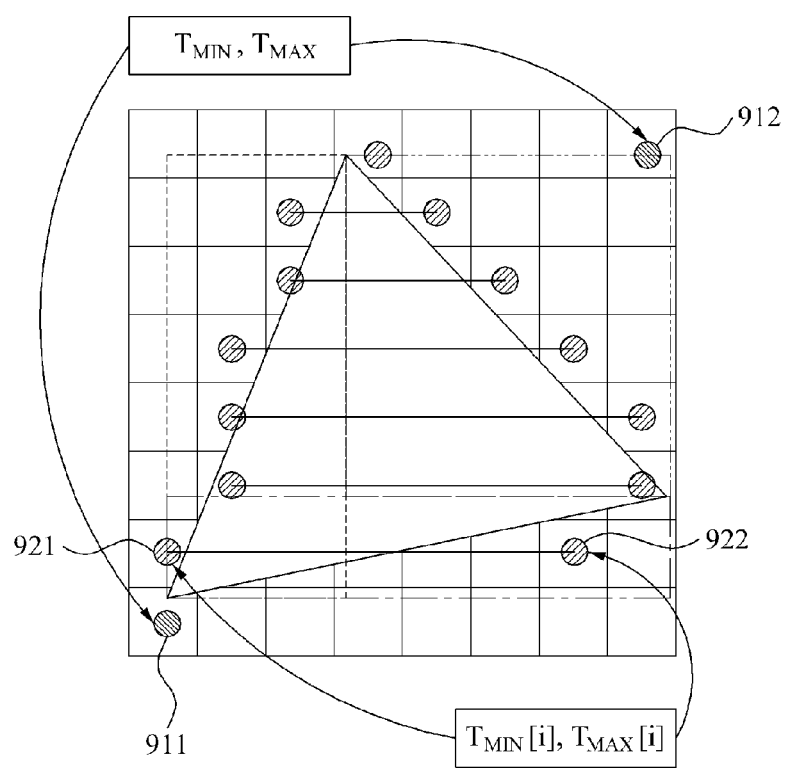
FIG. 9 illustrates a variable updated when an overlap test unit of a tile binning apparatus according to example embodiments scans a bounding box of an edge.

FIG. 9 illustrates a variable updated when an overlap test unit of a tile binning apparatus according to example embodiments scans a bounding box of an edge.

Referring to FIG. 9, conventionally, four floating point values are necessary to indicate a minimum (Min) 911 and a maximum (Max) 912 of a bounding box of a triangle. That is, $(X_{min}, Y_{min})$ is necessary to indicate the Min 911 and $(X_{max}, Y_{max})$ is necessary to indicate the Max 912.

However, the tile binning apparatus may perform scanning of the overlap test with respect to each Y-axis of the bounding box and thus, require only Min 921 and Max 922 of each Y-axis. Therefore, the overlap test unit of the tile binning apparatus may update only a line end or a line start according to a type of the bounding box of the edge as described with reference to FIG. 5.

Figure 10:
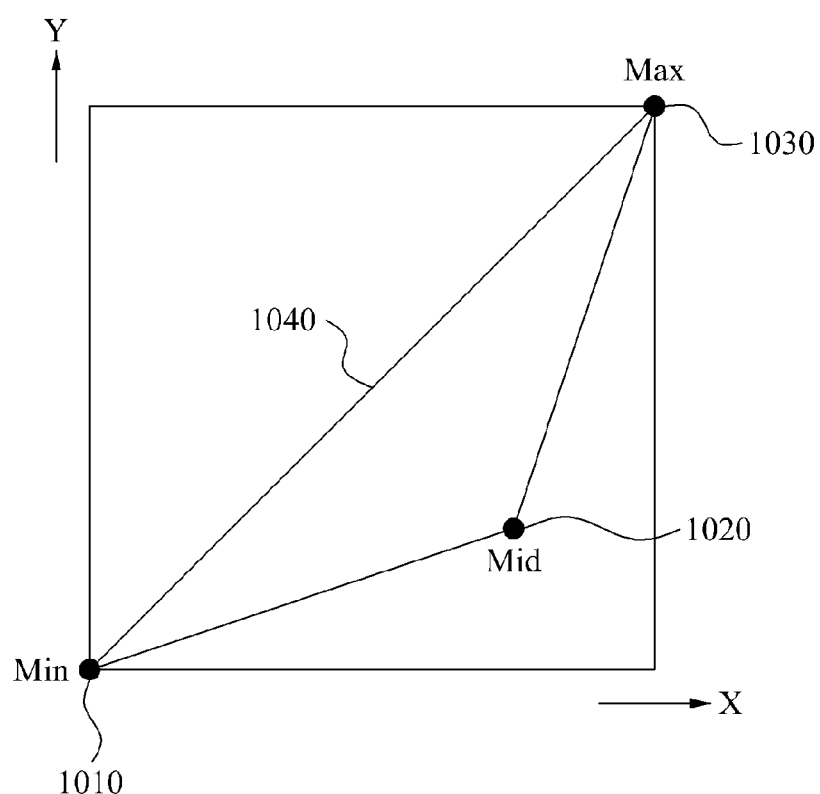
FIG. 10 illustrates an operation of sorting three vertices of a triangle including an abnormal edge according to Y-axis values, by an overlap test unit of a tile binning apparatus according to example embodiments.

FIG. 10 illustrates an operation of sorting three vertices of a triangle including an abnormal edge according to Y-axis values, such as by an overlap test unit of a tile binning apparatus, according to example embodiments.

Referring to FIG. 10, a bounding box of an edge 1040 and a bounding box of a triangle 1041 share four overlapping vertices, that is, the bounding box of the edge 1040 and the bounding box of the triangle 1041 have at least two same vertices. Therefore, the overlap test unit may determine the edge 1040 to be the abnormal edge.

Therefore, the overlap test unit of the tile binning apparatus may sort three vertices 1010, 1020, and 1030 of the triangle including the abnormal edge 1040 according to Y-axis values.

Here, since a Y-axis value of the vertex 1010 is smallest among the three vertices, the overlap test unit may sort the vertex 1010 as a minimum vertex. Since a Y-axis value of the vertex 1020 is of a medium value among the three vertices, the overlap test unit may sort the vertex 1020 as a medium vertex. Since a Y-axis value of the vertex 1030 is largest among the three vertices, the overlap test unit may sort the vertex 1030 as a maximum vertex.

An edge connecting the minimum vertex 1010 and the maximum vertex 1030 may be referred to as a first edge. An edge connecting the minimum vertex 1010 and the medium vertex 1020 may be referred to as a second edge. An edge connecting the medium vertex 1030 and the maximum vertex 1030 may be referred to as a third edge.

FIG. 11 illustrates a second table including an overlap test method according to a type of a triangle including an abnormal edge, according to example embodiments.

Referring to FIG. 11, the second table may include types 1111, 1112, 1113, and 1114 corresponding to the triangle including the abnormal edge, and overlap test methods related to a first edge, a second edge, and a third edge according to the respective types 1111, 1112, 1113, and 1114.

The overlap test unit may determine a slope of the first edge that connects a minimum vertex with a maximum vertex and a position of a medium vertex relative to a position of the first edge, and then determine the type of the triangle based on the slope and the position of the medium vertex.

For example, when the slope has a positive value and the medium vertex is located on the right of the first edge, the overlap test unit may determine the type of the triangle including the abnormal edge to be 'abnormal edge_positive_right' 1111. Here, by referencing the second table, the overlap test unit may determine a type of a bounding box of a Min-Max edge 1101, that is, the first edge that connects the minimum vertex with the maximum vertex as 'positive-right', a type of a bounding box of a Min-Mid edge 1102, that is, the second edge that connects the minimum vertex with the medium vertex to be 'positive-left', and a type of a bounding box of a Mid-Max edge 1103, that is, the third edge that connects the medium vertex with the maximum vertex to be 'positive-left.'

In addition, when the slope has a positive value and the medium vertex is located on the left of the first edge, the overlap test unit may determine the type of the triangle including the abnormal edge to be 'abnormal edge_positive_left' 1112. Here, by referencing the second table, the overlap test unit may determine the type of the bounding box of the Min-Max edge 1101, that is, the first edge that connects the minimum vertex with the maximum vertex to be 'positive-left', the type of the bounding box of the Min-Mid edge 1102, that is, the second edge that connects the minimum vertex with the medium vertex to be 'positive-right', and the type of the bounding box of the Mid-Max edge 1103, that is, the third edge that connects the medium vertex with the maximum vertex to be 'positive-right.'

In addition, when the slope has a negative value and the medium vertex is located on the right of the first edge, the overlap test unit may determine the type of the triangle including the abnormal edge to be 'abnormal edge_negative_right' 1113. Here, by referencing the second table, the overlap test unit may determine the type of the bounding box of the Min-Max edge 1101, that is, the first edge that connects the minimum vertex with the maximum vertex to be 'negative-right', the type of the bounding box of the Min-Mid edge

1102, that is, the second edge that connects the minimum vertex with the medium vertex to be 'negative-left', and the type of the bounding box of the Mid-Max edge 1103, that is, the third edge that connects the medium vertex with the maximum vertex to be 'negative-left.'

In addition, when the slope has a negative value and the medium vertex is located on the left of the first edge, the overlap test unit may determine the type of the triangle including the abnormal edge to be 'abnormal edge_negative_left' 1114. Here, by referencing the second table, the overlap test unit may determine the type of the bounding box of the Min-Max edge 1101, that is, the first edge that connects the minimum vertex with the maximum vertex to be 'negative-left', the type of the bounding box of the Min-Mid edge 1102, that is, the second edge that connects the minimum vertex with the medium vertex to be 'negative-right', and the type of the bounding box of the Mid-Max edge 1103, that is, the third edge that connects the medium vertex with the maximum vertex to be 'negative-right.'

As mentioned previously, the overlap test unit may determine the type of the bounding box of the first edge, the second edge, and the third edge, depending on the type of the triangle including the abnormal edge, by referencing the second table. Also, the overlap test unit may perform the overlap test with respect to each edge by an overlap test method corresponding to the type of the bounding box determined using the first table illustrated with reference to FIG. 5.

Figure 12:
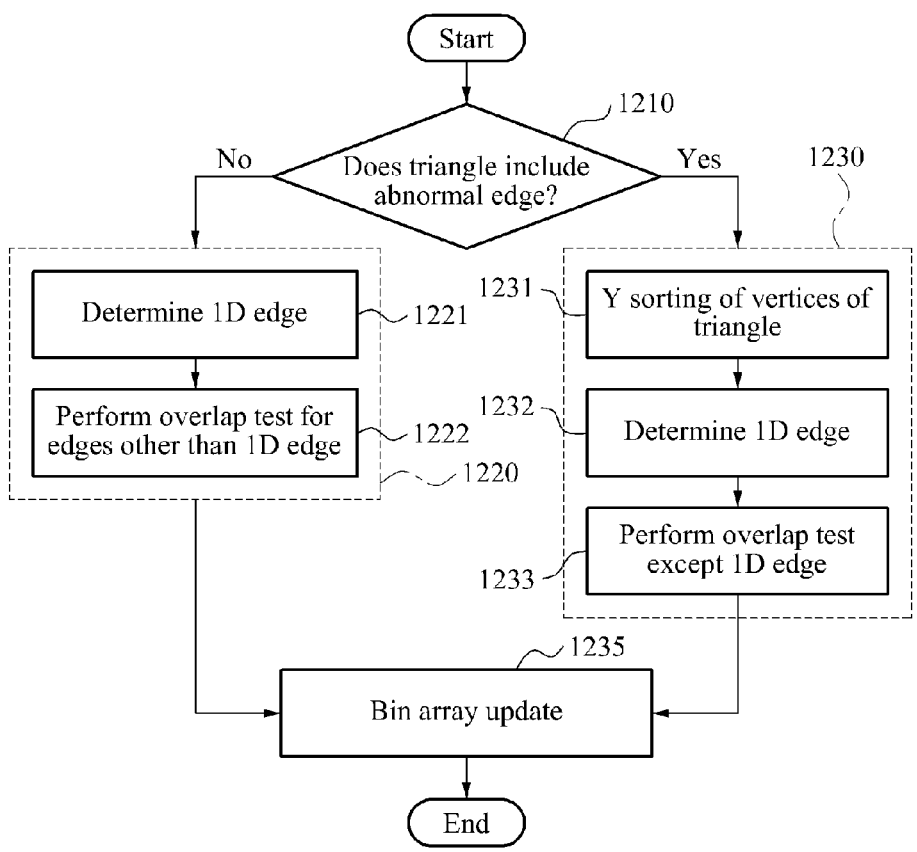
FIG. 12 illustrates a tile binning method according to example embodiments.

FIG. 12 illustrates a tile binning method according to example embodiments.

Referring to FIG. 12, the tile binning method, which may be performed in the tile binning unit 103 of FIG. 1, may perform an overlap test for determining which tile, among a plurality of tiles constituting a 2D plane, overlaps a triangle. Here, the tile binning method may perform the overlap test for each edge of the triangle as a method for acquiring an increased efficiency with a reduced amount of power consumption by reducing the OF. That is, the overlap test method may determine the tile overlapping the triangle, not based on a bounding box with respect to the entire triangle but based on a bounding box with respect to each edge of the triangle.

Hereinafter, respective operations of the tile binning method will be described in detail.

In operation 1210, the tile binning method may determine whether a triangle obtained as a result of geometry processing includes an abnormal edge.

When vertices of a bounding box of an edge and vertices of a bounding box of a triangle share at least two overlapping vertices, the edge is referred to as an abnormal edge. Therefore, when four vertices of a bounding box of an edge of a triangle includes at least two vertices overlapping with vertices of a bounding box of the triangle, the tile binning method may determine the edge to be the abnormal edge.

The tile binning method may perform the overlap test differently depending on whether the triangle includes the abnormal edge.

When the abnormal edge is absent from the triangle, the tile binning method may perform the overlap test with respect to each edge of the triangle in operation 1220. When the triangle includes the abnormal edge, the tile binning method may sort three vertices of the triangle according to Y-axis values and perform the overlap test with respect to each edge of the triangle based on the sorting result, in operation 1230.

When the abnormal edge is absent from the triangle, the tile binning method may determine whether the triangle includes a 1D edge in operation 1221. When a tile overlapping any one edge of the triangle is 1D, the edge is referred to as the 1D edge. Therefore, when a tile overlapping any one edge of the triangle is 1D, the tile binning method may determine the edge as the 1D edge.

When the 1D edge is included among the three edges of the triangle, the tile binning method may perform the overlap test with respect to the remaining edges other than the 1D edge in operation 1222. This is because, when any one edge of the triangle is the 1D edge, all tiles in a bounding box of the 1D edge overlap the 1D edge and therefore, the overlap test is unnecessary. Therefore, as mentioned above, the tile binning method may perform the overlap test only with respect to the remaining edges other than the 1D edge, thereby reducing an number of operations performed in the overlap test.

The tile binning method may determine slopes of the remaining edges except the 1D edge. For example, the tile binning method may determine whether the slopes of the remaining edges have a positive value and a negative value.

In addition, the tile binning method may determine a position of the triangle relative to positions of the remaining edges other than the 1D edge. For example, the tile binning method may determine whether the triangle is located on the left or on the right of the remaining edges.

When the slopes of the remaining edges and the position of the triangle are determined, the tile binning method may determine types of bounding boxes of the remaining edges using the slopes and the position of the triangle. For example, when an edge has a positive slope and the triangle is located on the right of the edge, the type of the bounding box of the edge may be 'positive-right.'

When the types of the bounding boxes of the remaining edges are determined, the tile binning method may select the overlap test method corresponding to the determined types of the bounding boxes by referencing a first table. In addition, the tile binning method may perform the overlap test with respect to the remaining edges using the selected overlap test method.

According to an aspect, the tile binning method may perform the overlap test using the first table that records the overlap test method according to types of the bounding box of the edge recorded in a DB. Here, the first table may include information on a scan orientation for performing the overlap test depending on the position of the triangle relative to the slopes and the positions of the edges and on an update variable.

Therefore, the tile binning method may extract scan orientation information corresponding to the determined types of the bounding boxes from the first table, and scan tiles within the bounding boxes according to the extracted scan orientation, thereby performing the overlap test.

When the triangle includes the abnormal edge, the tile binning method may sort three vertices of the triangle into a minimum vertex, a medium vertex, and a maximum vertex, in operation 1231. For example, the tile binning method may sort the three vertices into a vertex having a smallest Y-axis value as the minimum vertex, a vertex having a medium Y-axis value as the medium vertex, and a vertex having a largest Y-axis value as the maximum vertex.

An edge connecting the minimum vertex and the maximum vertex is defined as a first edge, an edge connecting the minimum vertex and the medium vertex is defined as a second edge, and an edge connecting the medium vertex and the maximum vertex is defined as a third edge. The tile binning method may determine whether the first edge, the second edge, and the third edge include an edge corresponding to the 1D edge, in operation 1232.

When the 1D edge is included among the first edge, the second edge, and the third edge, the tile binning method may perform the overlap test with respect to remaining edges other than the 1D edge in operation 1233.

In operation 1235, a bin array may then be updated based on a result of the overlap testing.

The tile binning method may determine a slope of the first edge that connects the minimum vertex and the maximum vertex. For example, the tile binning method may determine the slope of the first edge to be a positive value or a negative value.

In addition, the tile binning method may determine a position of the medium vertex relative to a position of the first edge. For example, the tile binning method may determine the position of the medium vertex to be right or left of the first edge.

When the slope of the first edge and the position of the medium vertex are determined, the tile binning method may determine a type of the triangle including the abnormal edge using the determined slope and position. For example, when the first edge has a negative slope and the triangle is located on the left of the first edge, the type of the triangle including the abnormal edge may be 'negative-left.'

When the type of the triangle including the abnormal edge is determined, the tile binning method may select a method of the overlap test performed with respect to the first edge, the second edge, and the third edge corresponding to the determined type of the triangle by referencing a second table. In addition, the tile binning method may perform the overlap test with respect to the first edge, the second edge, and the third edge, respectively, using the selected overlap test method.

According to an aspect, the tile binning method may perform the overlap test using the second table which records the overlap test method depending on the type of the triangle including the abnormal edge.

The second table may include types of bounding boxes with respect to the first edge, the second edge, and the third edge according to the type of the triangle including the abnormal edge. Therefore, when the type of the triangle is determined, the tile binning method may determine the types of the bounding boxes with respect to the first edge, the second edge, and the third edge, by referencing the second table, and determine the overlap test method corresponding to the respective types of the bounding boxes by referencing the first table. Accordingly, the tile binning method may perform the overlap test with respect to the first edge, the second edge, and the third edge.

The methods according to the above-described example embodiments may be recorded in non-transitory computer-readable media including program instructions to implement various operations embodied by a computer or processor. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the tile binning apparatus described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A tile binning apparatus comprising:
   a determination unit configured to determine whether a triangle obtained as a result of geometric processing comprises an abnormal edge, an edge of the triangle being an abnormal edge in response to at least two vertices of a bounding box of the edge of the triangle overlapping respective vertices of a bounding box of the triangle;
   an overlap test unit configured to
      perform an overlap test with respect to each edge of the triangle in response to the triangle being determined to be without the abnormal edge, and
      sort three vertices of the triangle based on Y-axis values, and perform the overlap test with respect to each edge of the triangle based on a result of the sorting in response to the triangle being determined to comprise the abnormal edge; and
   a bin array update unit configured to update a bin array based on a result of the overlap.

2. The tile binning apparatus of claim 1, wherein the overlap test unit is configured to:
   determine whether the triangle comprises a one-dimensional (1D) edge in response to the triangle being determined to be without the abnormal edge; and
   perform the overlap test with respect to remaining edges other than the 1D edge among three edges of the triangle in response to the triangle being determined to comprise the 1D edge.

3. The tile binning apparatus of claim 2, wherein an edge of the triangle is a 1D edge in response to a tile overlapping the edge being 1D.

4. The tile binning apparatus of claim 2, further comprising:
   a database configured to store a first table recording a method of the overlap test based on a type of a bounding box of the 1D edge,
   wherein the overlap test unit is configured to
      determine slopes of the remaining edges,
      determine a position of the triangle relative to positions of the remaining edges,
      determine a type of a bounding box of each of the remaining edges based on the slopes and the position of the triangle,
      extract a method of the overlap test corresponding to the type of the bounding box of each of the remaining edges from the first table, and
      perform the overlap test with respect to the remaining edges based on the extracted method.

5. The tile binning apparatus of claim 4, wherein the first table comprises information of a scan orientation for performing the overlap test based on the position of the triangle relative to a slope and a position of the 1D edge, and an update variable.

6. The tile binning apparatus of claim 2, wherein an edge of the triangle is a 1D edge in response to a minimum X-axis value of a bounding box of the edge of the triangle being equal to a maximum X-axis value of the bounding box of the edge of the triangle, and/or a minimum Y-axis value of the bounding box of the edge of the triangle being equal to a maximum Y-axis value of the bounding box of the edge of the triangle.

7. The tile binning apparatus of claim 1, wherein the overlap test unit is configured to:
  sort the three vertices of the triangle based on the Y-axis values into a minimum vertex, a medium vertex, and a maximum vertex in response to the triangle being determined to comprise the abnormal edge;
  determine whether the triangle comprises a one-dimensional (1D) edge among a first edge connecting the minimum vertex and the maximum vertex, a second edge connecting the minimum vertex and the medium vertex, and a third edge connecting the medium vertex and the maximum vertex; and
  perform the overlap test with respect to remaining edges other than the 1D edge among the first edge, the second edge, and the third edge in response to the triangle being determined to comprise the 1D edge.

8. The tile binning apparatus of claim 7, further comprising:
  a database recording a second table recording a method of the overlap test based on a type of the triangle comprising the abnormal edge,
  wherein the overlap test unit is configured to
    determine a slope of the first edge,
    determine a position of the medium vertex relative to a position of the first edge,
    determine the type of the triangle comprising the abnormal edge based on the slope and the position of the medium vertex,
    extract a method of the overlap test performed with respect to the first edge, the second edge, and the third edge corresponding to the type of the triangle comprising the abnormal edge from the second table, and
    perform the overlap test with respect to the remaining edges other than the 1D edge among the first edge, the second edge, and the third edge based on the extracted method.

9. The tile binning apparatus of claim 1, wherein the determination unit is configured to:
  generate the bounding box of the edge of the triangle and the bounding box of the triangle.

10. A tile binning method comprising:
  determining whether a triangle obtained as a result of geometric processing comprises an abnormal edge, an edge of the triangle being an abnormal edge in response to at least two vertices of a bounding box of the edge of the triangle overlapping respective vertices of a bounding box of the triangle;
  performing an overlap test with respect to each edge of the triangle in response to the triangle being determined to be without the abnormal edge;
  sorting three vertices of the triangle based on Y-axis values, and performing the overlap test with respect to each edge of the triangle based on a result of the sorting, in response to the triangle being determined to comprise the abnormal edge; and
  updating a bin array based on a result of the overlap test.

11. The tile binning method of claim 10, wherein the performing of the overlap test comprises:
  determining whether the triangle comprises a one-dimensional (1D) edge in response to the triangle being determined to be without the abnormal edge; and
  performing the overlap test with respect to remaining edges other than the 1D edge among three edges of the triangle in response to the triangle being determined to comprise the 1D edge.

12. The tile binning method of claim 10, wherein the performing the overlap test comprises:
  sorting the three vertices of the triangle based on the Y-axis values into a minimum vertex, a medium vertex, and a maximum vertex in response to the triangle being determined to comprise the abnormal edge;
  determining whether the triangle comprises a one-dimensional (1D) edge among a first edge connecting the minimum vertex and the maximum vertex, a second edge connecting the minimum vertex and the medium vertex, and a third edge connecting the medium vertex and the maximum vertex; and
  performing the overlap test with respect to remaining edges other than the 1D edge among the first edge, the second edge, and the third edge in response to the triangle being determined to comprise the 1D edge.

13. A non-transitory computer readable recording medium storing a program to cause a computer to implement the method of claim 10.

14. A tile binning apparatus comprising:
  a determination unit configured to determine whether a triangle obtained as a result of geometric processing comprises an abnormal edge, an edge of the triangle being an abnormal edge in response to at least two vertices of a bounding box of the edge of the triangle overlapping respective vertices of a bounding box of the triangle; and
  an overlap test unit configured to
    determine whether the triangle comprises a one-dimensional (1D) edge in response to the triangle being determined to be without the abnormal edge, and
    perform an overlap test with respect to each edge of the triangle other than the 1D edge in response to the triangle being determined to comprise the 1D edge.

15. The tile binning apparatus of claim 14, further comprising:
  a bin array update unit configured to update a bin array based on a result of the overlap test.

16. A tile binning method comprising:
  determining whether a triangle obtained as a result of geometric processing comprises an abnormal edge, an edge of the triangle being an abnormal edge in response to at least two vertices of a bounding box of the edge of the triangle overlapping respective vertices of a bounding box of the triangle;
  determining whether the triangle comprises a one-dimensional (1D) edge in response to the triangle being determined to be without the abnormal edge; and
  performing an overlap test with respect to each edge of the triangle other than the 1D edge in response to the triangle being determined to comprise the 1D edge.

17. The tile binning method of claim 16, further comprising:
  updating a bin array based on a result of the overlap test.

18. A non-transitory computer readable recording medium storing a program to cause a computer to implement the method of claim 16.

* * * * *